(12) United States Patent
Goto et al.

(10) Patent No.: US 9,664,071 B2
(45) Date of Patent: May 30, 2017

(54) STEAM TURBINE PLANT

(75) Inventors: Koichi Goto, Yokohama (JP); Nobuo Okita, Ushiku (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 38 days.

(21) Appl. No.: 13/081,296

(22) Filed: Apr. 6, 2011

(65) Prior Publication Data

US 2011/0247330 A1 Oct. 13, 2011

(30) Foreign Application Priority Data

Apr. 7, 2010 (JP) .................................. 2010-88671

(51) Int. Cl.
*F01K 7/22* (2006.01)
*F01K 7/18* (2006.01)
*F22B 1/00* (2006.01)

(52) U.S. Cl.
CPC .................. *F01K 7/18* (2013.01); *F01K 7/22* (2013.01); *F22B 1/006* (2013.01); *Y02E 10/46* (2013.01)

(58) Field of Classification Search
CPC .......... F01K 23/103; F01K 7/22; F01K 25/08; F01K 7/18; F01K 7/226; F01K 13/025; F03G 6/005; F03G 6/067; Y02E 10/10; Y02E 10/14; Y02E 10/34; Y02E 10/46; Y02E 10/722; Y02E 10/725; Y02E 10/726; Y02E 20/12; Y02E 20/14; Y02E 20/16; Y02E 20/18; Y02E 20/344; Y02E 20/346; Y02E 20/363; Y02E 30/10; Y02E 30/30; Y02E 30/31; Y02E 30/33; Y02E 30/36; Y02E 30/38; Y02E 30/39; Y02E 30/40;

(Continued)

(56) References Cited

U.S. PATENT DOCUMENTS 2,064,444 A 12/1936 Mosshart et al.
4,117,682 A 10/1978 Smith
(Continued)

FOREIGN PATENT DOCUMENTS

DE EP 1154123 A1 * 11/2001 ............. F01D 5/084
DE 101 28 562 C1 1/2003
(Continued)

OTHER PUBLICATIONS

Machine translation of EP1154123A1, accessed on Sep. 14, 2016.*
(Continued)

*Primary Examiner* — Jonathan Matthias
(74) *Attorney, Agent, or Firm* — Foley & Lardner LLP

(57) ABSTRACT

A steam turbine plant of one embodiment includes at least one heater configured to change water into steam to produce high pressure steam and low pressure steam having a lower pressure than the high pressure steam, a high pressure turbine including a turbine or turbines connected to each other in series, and having a first inlet to supply the high pressure steam, a second inlet to supply the low pressure steam and located at a downstream of the first inlet, and an exhaust port located at a downstream of the second inlet, the high pressure turbine being configured to be driven by the steam supplied from the first and second inlets, a reheater configured to heat the steam exhausted from the exhaust port, and a reheat turbine configured to be driven by the steam from the reheater.

7 Claims, 4 Drawing Sheets

(58) Field of Classification Search
CPC ......... Y02E 50/14; Y02E 50/15; Y02E 60/17; F22B 1/006
USPC .......... 60/653, 677, 679, 680, 641.8–641.15
See application file for complete search history.

(56) References Cited

U.S. PATENT DOCUMENTS

| | | | | |
|---|---|---|---|---|
| 4,343,999 | A | * | 8/1982 | Wolf ................................ 290/2 |
| 4,364,232 | A | * | 12/1982 | Sheinbaum .................. 60/641.2 |
| 4,387,576 | A | * | 6/1983 | Bissell ............................ 60/649 |
| 4,433,545 | A | | 2/1984 | Chang |
| 4,476,853 | A | * | 10/1984 | Arbogast ..................... 126/578 |
| 4,873,827 | A | | 10/1989 | Hadano et al. |
| 5,775,091 | A | * | 7/1998 | Bannister et al. .............. 60/775 |
| 5,873,238 | A | * | 2/1999 | Bellows .................... 60/39.182 |
| 5,925,223 | A | * | 7/1999 | Simpson et al. ................ 203/11 |
| 6,442,924 | B1 | | 9/2002 | Talley et al. |
| 2004/0261417 | A1 | * | 12/2004 | Yamashita et al. ............ 60/679 |
| 2005/0279095 | A1 | | 12/2005 | Goldman |
| 2008/0245071 | A1 | * | 10/2008 | Kawakami et al. ............ 60/670 |
| 2010/0175365 | A1 | | 7/2010 | Ota |
| 2010/0212318 | A1 | | 8/2010 | Schaal |

FOREIGN PATENT DOCUMENTS

| | | |
|---|---|---|
| EP | 1 028 233 B1 | 8/2000 |
| EP | 2 187 051 A1 | 5/2010 |
| JP | 60-180703 U | 11/1985 |
| JP | 61-038110 A | 2/1986 |
| JP | 02-140404 A | 5/1990 |
| JP | 2008-039367 A | 2/2008 |
| JP | 2008-121483 A | 5/2008 |
| WO | WO 98/17897 A1 | 4/1998 |
| WO | WO 2009/034577 A2 | 3/2009 |

OTHER PUBLICATIONS

U.S. Appl. No. 13/081,293, filed Apr. 6, 2011, Goto.
U.S. Appl. No. 13/081,300, filed Apr. 6, 2011, Goto.
K. Goto, U.S. PTO Office Action, U.S. Appl. No. 13/081,293, dated Jun. 6, 2013, 12 pages.
K. Goto, U.S. PTO Office Action, U.S. Appl. No. 13/081,293, dated Jan. 16, 2014, 12 pages.
K. Goto, U.S. PTO Office Action, U.S. Appl. No. 13/081,293, dated Sep. 16, 2013, 11 pages.
Japanese Office Action and English Translation, dated Dec. 13, 2013, U.S. Appl. No. 13/081,293, 6 pages.
K. Goto, U.S. PTO Office Action, U.S. Appl. No. 13/081,300, dated Feb. 21, 2014, 16 pages.
K. Goto, U.S. PTO Notice of Allowance, U.S. Appl. No. 13/081,293, dated Jun. 9, 2014, 8 pages.
K. Goto, U.S. PTO Notice of Allowance, U.S. Appl. No. 13/081,300, dated Jun. 17, 2014, 7 pages.
Chinese Office Action dated Jul. 22, 2015 issued in corresponding Chinese Application No. 2011100874401.

* cited by examiner

STEAM TURBINE PLANT

CROSS REFERENCE TO RELATED APPLICATION

This application is based upon and claims the benefit of priority from the prior Japanese Patent Application No. 2010-88671, filed on Apr. 7, 2010, the entire contents of which are incorporated herein by reference.

BACKGROUND OF THE INVENTION

Field of the Invention

The present invention relates to a steam turbine plant, for example, using solar heat.

Background Art

FIG. 5 is a schematic diagram illustrating an example of a conventional steam turbine plant using solar heat. A steam turbine cycle of the plant of FIG. 5 will be described.

A heating medium 118 is transferred to a solar energy collector 119 collecting solar heat by a heating medium pump 116. The heating medium 118 is, for example, oil. The heating medium 118 is heated by radiant heat of a solar ray 117 at the solar energy collector 119. Subsequently, the heating medium 118 is transferred to a heater 110 as a heat exchanger, and a heating object such as water or steam is heated therein. The temperature of the heating medium 118 decreases at the heater 110, and returns to the upstream of the heating medium pump 116. In this way, the heating medium 118 circulates.

In the nighttime when the solar ray 117 may not be received or in the weather of daytime when the solar ray 117 is weak, the heating medium 118 accumulated in a heat accumulating tank is circulated or the heating medium 118 is circulated to a line heated by an auxiliary boiler. However, the devices or the flow thereof are not shown herein. Meanwhile, in this case, the heating medium 118 bypasses the solar energy collector 119.

As the solar energy collector 119, various types may be used, but a trough condensing type shown in FIG. 8 is used in many cases. FIG. 8 is a schematic diagram illustrating an example of the trough condensing type solar energy collector 119. The solar energy collector 119 of FIG. 8 condenses the solar ray 117 by a collector mirror 123 and heats a solar energy collection pipe 124. The heating medium 118 circulates in the solar energy collection pipe 124, and the temperature of the heating medium 118 increases by radiant heat transmitted from the solar ray 117 to the solar energy collection pipe 124. The upstream and the downstream of the solar energy collection pipe 124 are respectively connected to heating medium pipes 125. Although the solar energy collection pipe 124 is made by the careful examination, the pipe will not be described herein in detail.

Hereinafter, returning to FIG. 5, the description of the steam turbine plant will be continued.

In many cases, the conventional steam turbine cycle is configured as a single-stage reheating cycle that includes a high pressure turbine 101 and a reheat turbine. An intermediate pressure turbine 102 and a low pressure turbine 103 are treated as a continuous reheat turbine 113.

The heater 110 includes a boiler 108 which changes water 111 into steam 112 by the heat of the heating medium 118, and a reheater 109 which heats steam for the reheat turbine 113. The water 111 is transferred to the boiler 108 as a part of the heater 110 by the pump 105, and is heated by the boiler 108 so that the water changes into high pressure turbine inlet steam 112. In FIG. 5, the inlet at the most upstream of the high pressure turbine 101 is denoted by the symbol X.

The high pressure turbine inlet steam 112 flows into the high pressure turbine 101 and expands inside the high pressure turbine 101 so that the pressure and the temperature thereof decrease. The high pressure turbine 101 is driven by the high pressure turbine inlet steam 112. In the steam turbine cycle using solar heat, the temperature of the high pressure turbine inlet steam 112 is lower than that of the steam turbine cycle using heat of combusted exhaust gas of fuel in many cases. For this reason, the high pressure turbine exhaust 114 is not all dry steam as gas, but is partly mixed with a liquid. That is, it is humid steam in which the dryness degree is less than 1.

In FIG. 5, a high pressure turbine steam outlet (an exhaust port) located at the most downstream of the high pressure turbine 101 is denoted by the symbol Y. The high pressure turbine exhaust 114 flows into the reheater 109 as a part of the heater 110, is heated by the heat of the heating medium 118, and flows into the intermediate pressure turbine 102.

Intermediate pressure turbine inlet steam 106 expands inside the intermediate pressure turbine 102 so that the pressure and the temperature thereof both decrease and flows into the low pressure turbine 103. The steam flowing into the low pressure turbine 103 expands inside the low pressure turbine 103 so that the pressure and the temperature both decrease and the steam flows to the outside as humid steam. In this way, the intermediate pressure turbine 102 and the low pressure turbine 103 are driven as well as the high pressure turbine 101.

The steam flowing from the low pressure turbine 103, that is, low pressure turbine exhaust 115 flows into a condenser 104. In the condenser 104, the low pressure turbine exhaust 115 is cooled by cooling water, and is returned to the water 111. The water 111 returns to the upstream of the pump 105. In this way, the water 111 and the steam 112 circulate. Meanwhile, seawater or stream water may be used as the cooling water, the water warmed at the condenser 104 may be cooled at a cooling tower using atmosphere, and the cooled water may be circulated.

The rotation shafts of the high pressure turbine 101, the intermediate pressure turbine 102, and the low pressure turbine 103 are connected to a power generator 107. The rotation shafts thereof are rotated as the high pressure turbine 101, the intermediate pressure turbine 102, and the low pressure turbine 103 are rotated by the expanding steam. By the rotation of the rotation shafts, power is generated in the power generator 107.

FIG. 6 is a schematic diagram illustrating another example of the conventional steam turbine plant using solar heat.

In FIG. 6, extraction steam 120 is extracted from one or more turbines among the high pressure turbine 101, the intermediate pressure turbine 102, and the low pressure turbine 103. A feed-water heater 121 using the extraction steam 120 as a heat source is provided between the condenser 104 and the boiler 108, and the water 111 is heated at the feed-water heater 121. In FIG. 6, the extraction port of the high pressure turbine 101 is denoted by the symbol Z. The number of the feed-water heaters 121 may be one or more (three heaters are shown in FIG. 6), and the extraction steam 120 may be supplied from one turbine to the plurality of feed-water heaters 121.

Likewise, the steam turbine cycle of the plant of FIG. 6 includes the reheating cycle and the reheat regeneration cycle as a regeneration cycle, and the conventional steam turbine cycle has that configuration in many cases. The cycle efficiency is improved by the effect of the regeneration cycle. The extraction steam 120 is cooled at the feed-water heater 121 so that the steam changes into water and is merged with the water 111 at a drain water pump 122. Meanwhile, in FIG. 6, the description of the flow of the heating medium 118 is omitted.

FIG. 7 is a diagram illustrating an example of an expansion line of the conventional steam turbine plant shown in FIG. 5 or 6. In FIG. 7, the vertical axis indicates specific enthalpy, and the horizontal axis indicates specific entropy.

In FIG. 7, a high pressure turbine expansion line 201, a reheat turbine expansion line 202, and a saturation line 203 are shown. Since the intermediate pressure turbine 102 and the low pressure turbine 103 are the continuous reheat turbine, the expansion line related to the turbine is one expansion line.

In FIG. 7, a high pressure turbine inlet point 204, a high pressure turbine outlet point 205, a reheat turbine inlet point (an intermediate pressure turbine inlet point) 206, and a reheat turbine outlet point (a low pressure turbine outlet point) 207 are shown.

In FIG. 7, the high pressure turbine exhaust 114 is heated at the reheater 109 up to a temperature equal to that of the high pressure turbine inlet steam 112. Further, in FIG. 7, when the steam changes from the high pressure turbine inlet point 204 to the high pressure turbine outlet point 205 or changes from the reheat turbine inlet point 206 to the reheat turbine outlet point 207, the steam changes more than the saturation line 203. Therefore, the steam is dry steam at the high pressure turbine inlet point 204 or the reheat turbine inlet point 206, and the steam is humid steam at the high pressure turbine outlet point 205 or the reheat turbine outlet point 207.

Meanwhile, JP-A 2008-39367 (KOKAI) describes an example of a solar power generation facility that includes a solar energy collection device heating a liquid thermal medium by the solar ray.

SUMMARY OF THE INVENTION

In a reheating cycle using solar heat, a large amount of the high pressure turbine inlet steam 112 is close to the humid region in the diagrammatic drawing of specific enthalpy-specific entropy, and a large amount of the high pressure turbine exhaust 114 becomes humid steam. The high pressure turbine inlet steam 112 has, for example, a pressure of 100 ata and a temperature of 380° C. At this time, a difference between the temperature of the steam at the inlet of the high pressure turbine 101 and the saturation temperature of the pressure of the steam at the inlet of the high pressure turbine 101 is about 70° C. The humid steam inside the high pressure turbine 101 causes moisture loss, and degrades the turbine internal efficiency. Further, since minute water drops collide with the surface of the turbine blade, erosion may be generated.

Further, since the steam flowing into the reheater 109 to become the intermediate pressure turbine inlet steam 106, that is, the high pressure turbine exhaust 114 is humid steam, specific enthalpy may not be specified even when the pressure or the temperature of the steam is measured. The specific enthalpy may be specified when the humidity degree of the steam is measured, but it is difficult to measure the humidity degree with high precision and simplicity. Therefore, since the amount of heat input from the heater 110 to the turbine cycle may not be specified, the thermal efficiency of the turbine cycle may not be recognized. Further, since the high pressure turbine exhaust 114 and the low pressure turbine exhaust 115 are both humid steam at the same time, the turbine internal efficiency thereof may not be specified.

Therefore, there is a demand for a steam turbine plant in which the steam other than in the vicinity of the outlet of the low pressure turbine 103 is not humid steam.

An aspect of the present invention is, for example, a steam turbine plant including at least one heater configured to change water into steam to produce high pressure steam and low pressure steam having a lower pressure than the high pressure steam, a high pressure turbine including a turbine or turbines connected to each other in series, and having a first inlet to supply the high pressure steam, a second inlet to supply the low pressure steam and located at a downstream of the first inlet, and an exhaust port located at a downstream of the second inlet, the high pressure turbine being configured to be driven by the steam supplied from the first and second inlets, a reheater configured to heat the steam exhausted from the exhaust port, and a reheat turbine configured to be driven by the steam from the reheater.

DESCRIPTION OF THE EMBODIMENTS

Embodiments of the invention will now be explained with reference to the accompanying drawings.

First Embodiment

Figure 1:
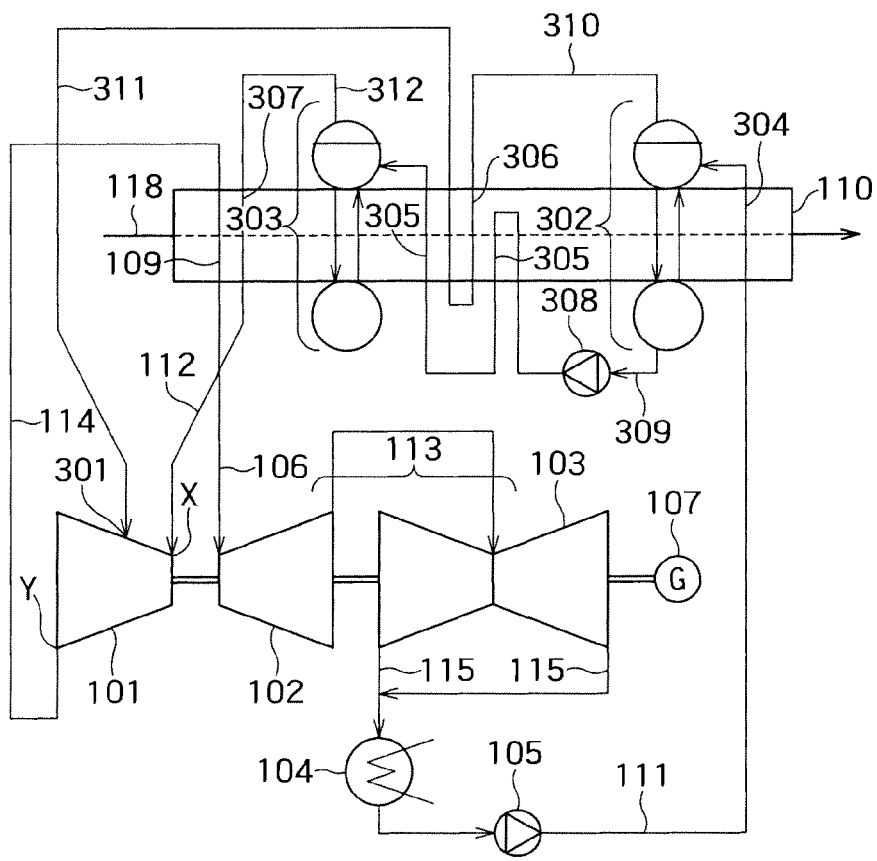
FIG. 1 is a schematic diagram illustrating a configuration of a steam turbine plant of a first embodiment.

FIG. 1 is a schematic diagram illustrating a configuration of a steam turbine plant of a first embodiment. As for the configuration shown in FIG. 1, the differences from the configuration shown in FIG. 5 will be mainly described.

A heater 110 of the embodiment produces high pressure steam 112 and low pressure steam 311 having a pressure lower than that of the high pressure steam 112 by changing water 111 into steam by heat of a heating medium 118. Furthermore, a high pressure turbine 101 includes a high pressure steam inlet X which is located at the most upstream of the high pressure turbine 101 and a low pressure steam inlet 301 which is located at the downstream of the high pressure steam inlet X. In the embodiment, a reheating cycle is configured such that the high pressure steam 112 flows from the high pressure steam inlet X and the low pressure steam 311 flows from the low pressure steam inlet 301. The high pressure turbine 101 further includes a steam outlet (an exhaust port) Y which is located at the downstream of the low pressure steam inlet 301 and is located at the most downstream of the high pressure turbine 101.

The high pressure turbine 101 is driven by steam flowing from each of the high pressure steam inlet X and the low pressure steam inlet 301 into the high pressure turbine 101. The high pressure steam inlet X is an example of a first inlet of the invention, and the low pressure steam inlet 301 is an example of a second inlet of the invention.

Figure 6:
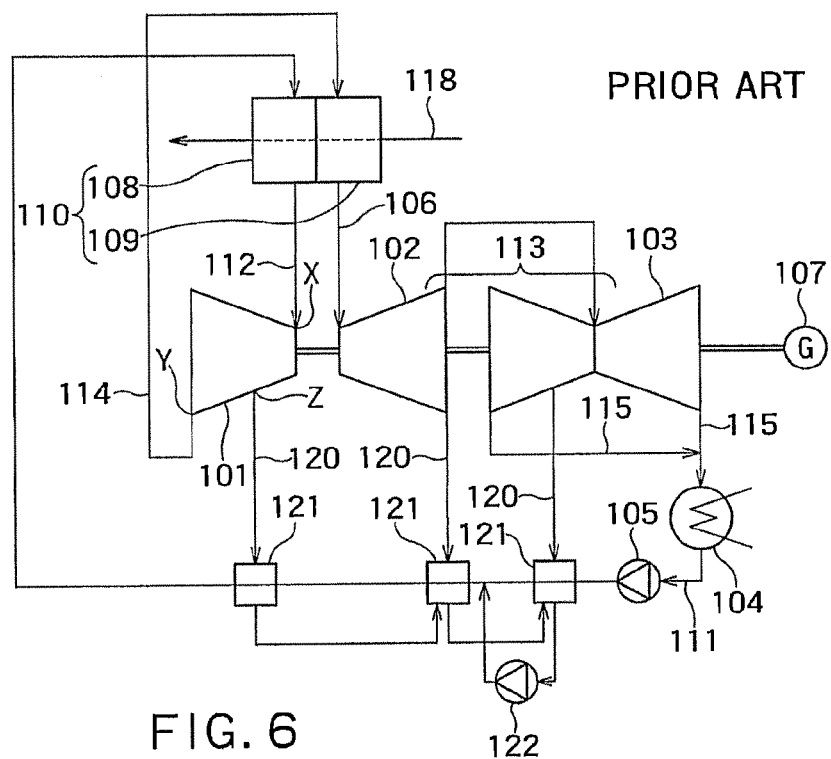
FIG. 6 is a schematic diagram illustrating another example of the conventional steam turbine plant.
Figure 7:
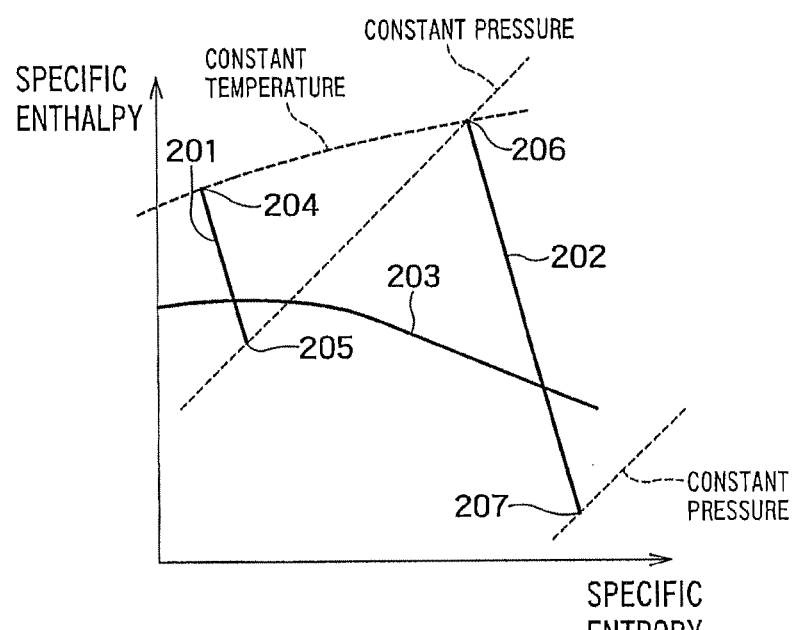
FIG. 7 is a diagram illustrating an example of an expansion line of the conventional steam turbine plant.

The heater 110 of the embodiment includes two economizers 304 and 305, two evaporators 302 and 303, two superheaters 306 and 307, and a reheater 109. In the embodiment, as shown in FIG. 6, a reheat regeneration cycle may be configured in which extraction steam 120 is extracted from the middle position of one or more turbines among the high pressure turbine 101, the intermediate pressure turbine 102, and the low pressure turbine 103, and the extraction steam 120 is used to heat the water 111 at a feed-water heater 121. Furthermore, the extraction steam 120 may be supplied from one turbine to a plurality of feed-water heaters 121.

As shown in FIG. 1, the water 111 is transferred to the first economizer (the low-temperature steam economizer) 304 by the pump 105 and is heated therein. Subsequently, the water 111 flows into the first evaporator (the low-temperature steam evaporator) 302, and changes into pre-superheating low pressure steam 310. The pre-superheating low pressure steam 310 is extracted from a gas portion of an upper steam drum constituting the first evaporator 302, flows into the first superheater (the low pressure steam superheater) 306, and is further heated therein. Accordingly, the pre-superheating low pressure steam 310 becomes the low pressure steam 311, and flows into the low pressure steam inlet 301.

At this time, the pressure of the low pressure steam 311 is higher than the pressure of the steam at the turbine stage of the low pressure steam inlet 301. Furthermore, since the low pressure steam 311 is sufficiently superheated at the first superheater 306, the temperature of the low pressure steam 311 is higher than the temperature of the steam at the turbine stage of the low pressure steam inlet 301. Meanwhile, in the case where a plurality of high pressure turbines 101 are connected to each other in series instead of the case where only one high pressure turbine 101 is provided as shown in FIG. 1, the turbine stage into which the low pressure steam 311 flows may be any high pressure turbine.

On the other hand, second water 309 as a liquid is extracted from a lower steam drum constituting the first evaporator 302. The second water 309 is boosted and transferred to the second economizer (the high pressure steam economizer) 305 by a second pump 308, and is heated therein. Subsequently, the second water 309 changes into a pre-superheating high pressure steam 312 in the second evaporator (the high pressure steam evaporator) 303. The pre-superheating high pressure steam 312 is extracted from a gas portion of an upper steam drum constituting the second evaporator 303, flows into the second superheater (the high pressure steam superheater) 307, and is further heated therein. Accordingly, the pre-superheating high pressure steam 312 becomes the high pressure steam (the high pressure turbine inlet steam) 112, and flows into the high pressure steam inlet X.

The high pressure steam 112 expands inside the high pressure turbine 101, and the pressure and the temperature thereof decrease as it goes to the downstream of the turbine stage in the axis direction of the turbine. In the embodiment, it is set such that the steam inside the high pressure turbine 101 does not change into humid steam at a time point of the turbine stage of the low pressure steam inlet 301.

When the steam inside the high pressure turbine 101 is merged with the low pressure steam 311, the temperature of the steam increases, and the pressure and the temperature of the steam decrease as it goes to the downstream of the turbine stage. In the embodiment, even when the steam inside the high pressure turbine 101 goes to the final stage of the high pressure turbine 101, the steam may not reach the humid region since the temperature of the steam increases when the low pressure steam 311 is merged with the steam. That is, in all stages of the high pressure turbine 101 including the high pressure turbine exhaust 114, the steam inside the high pressure turbine 101 may be maintained as dry steam without changing into humid steam.

Accordingly, in the embodiment, the high pressure turbine exhaust 114 becomes dry steam. After the high pressure turbine exhaust 114 is exhausted from an exhaust port Y and flows into the reheater 109 so that it is heated therein, the heated high pressure turbine exhaust 114 flows into the intermediate pressure turbine 102.

The steam flowing into the intermediate pressure turbine 102 expands inside the intermediate pressure turbine 102 so that the pressure and the temperature thereof decrease, and flows into the low pressure turbine 103. The steam flowing into the low pressure turbine 103 expands inside the low pressure turbine 103 so that the pressure and the temperature thereof decrease, and flows to the outside as humid steam. The rotation shafts of the high pressure turbine 101, the intermediate pressure turbine 102, and the low pressure turbine 103 rotated by the expanding steam are connected to a power generator 107, and power is generated in the power generator 107 with the rotation of the rotation shafts.

Figure 2:
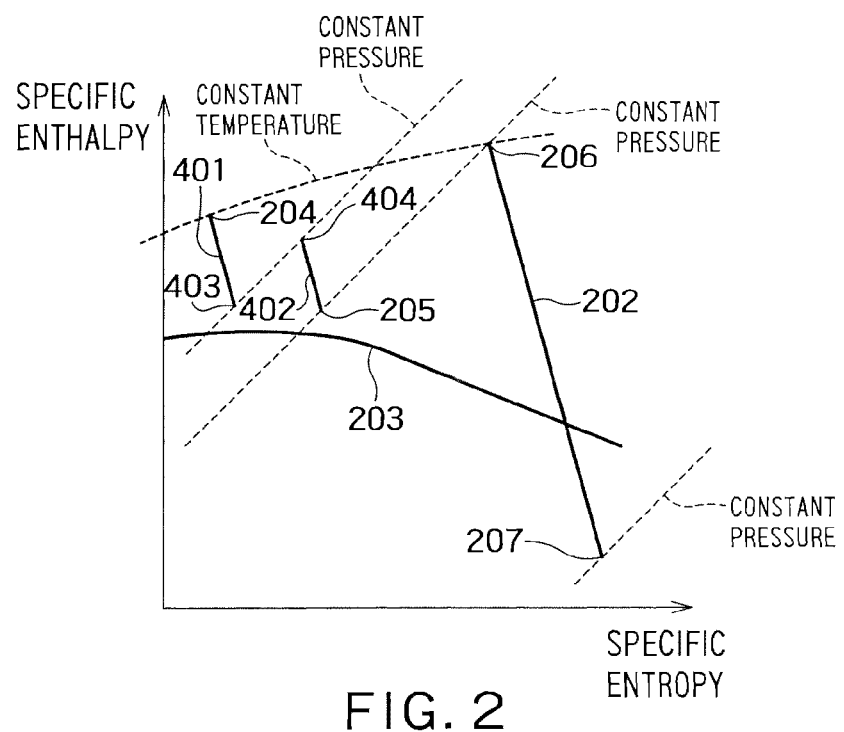
FIG. 2 is a diagram illustrating an example of an expansion line of the steam turbine plant shown in FIG. 1.

FIG. 2 is a diagram illustrating an example of an expansion line of the steam turbine plant shown in FIG. 1.

A pre-merging high pressure turbine expansion line 401 changes from a high pressure turbine inlet point 204 to a low pressure steam pre-merging point 403, and a post-merging high pressure turbine expansion line 402 changes from a low pressure steam post-merging point 404 to a high pressure turbine outlet point 205, but neither of them reach the humid region. In FIG. 2, the high pressure turbine exhaust 114 is heated at the reheater 109 up to a temperature equal to the temperature of the high pressure turbine inlet steam 112.

In the embodiment, a steam turbine cycle is realized in which the steam other than in the vicinity of the outlet of the low pressure turbine 103 is not humid steam without changing the statuses and the properties of the steam of the inlets of the high pressure turbine 101 and the reheat turbine 113. Accordingly, the humid steam is not present other than in the vicinity of the outlet of the low pressure turbine 103. Accordingly, a degradation of the turbine internal efficiency caused by moisture loss may be prevented, and the turbine cycle performance may be improved. Furthermore, there is no possibility of generating of erosion caused by minute water drops colliding with the surface of the turbine blade other than the vicinity of the outlet of the low pressure turbine 103.

Furthermore, since the high pressure turbine exhaust 114 is dry steam, specific enthalpy may be specified by measuring the pressure and the temperature thereof. Accordingly, the amount of heat input from the heater 110 to the turbine cycle may be specified, and the thermal efficiency of the turbine cycle may be recognized. Furthermore, since the turbine of which exhaust is humid steam is not plural, but the low pressure turbine 103 only, the internal efficiency of each turbine may be specified.

If a turbine cycle is provided such that the number of the turbine stages from the stage merged with the low pressure steam 311 increases and the reheat turbine 113 is removed, moisture loss until reaching the pressure of the condenser 104 increases so that the turbine cycle performance becomes lower than that of any one of the embodiment and the related art.

Hereinafter, various modifications of the embodiment will be described.

(Expansion Line of Steam Turbine Plant)

Figure 3:
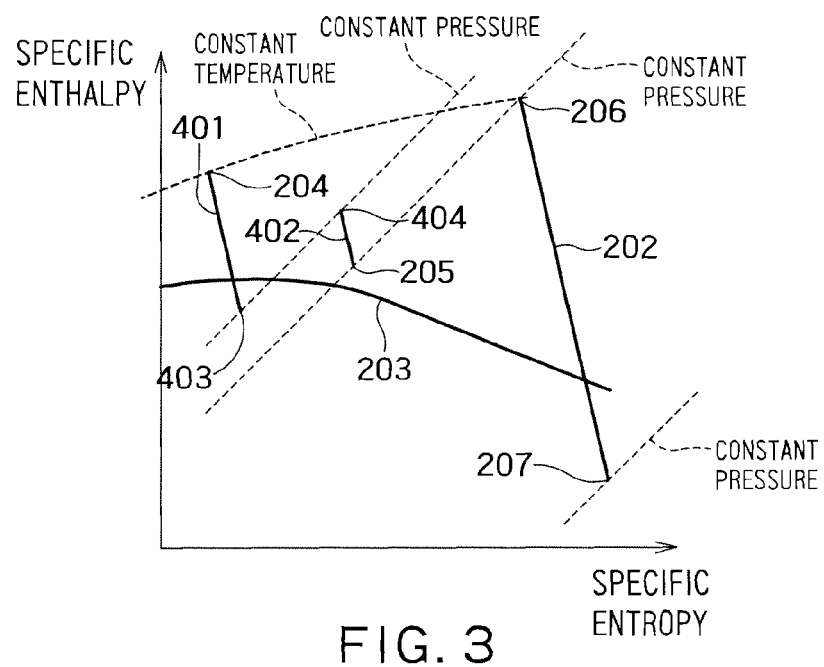
FIG. 3 is a diagram illustrating another example of the expansion line of the steam turbine plant shown in FIG. 1.

FIG. 3 is a diagram illustrating another example of the expansion line of the steam turbine plant shown in FIG. 1.

In FIG. 2, the steam inside the high pressure turbine 101 does not change into humid steam at a time point of the turbine stage of the low pressure steam inlet 301, but changes into humid steam in FIG. 3.

In the case of FIG. 3, when the high pressure steam 112 flows into the high pressure steam inlet X, the high pressure steam 112 expands inside the high pressure turbine 101, and the pressure and the temperature thereof decrease as it goes to the downstream of the turbine stage in the axis direction of the turbine. In the case of FIG. 3, the steam inside the high pressure turbine 101 changes into humid steam at a time point of the turbine stage of the low pressure steam inlet 301.

When the steam inside the high pressure turbine 101 is merged with the low pressure steam 311, the temperature of the steam increases so that the steam changes from humid steam into dry steam. Subsequently, the pressure and temperature thereof decrease as it goes to the downstream of the turbine stage. Even in the case of FIG. 3, it is possible that the steam inside the high pressure turbine 101 does not reach the humid region even when the steam goes to the steam outlet (the exhaust port) Y of the high pressure turbine 101 at the downstream of the low pressure steam post-merging point 404 since the temperature of the steam increases when the low pressure steam 311 is merged with the steam. In the related art, the steam is humid steam from the middle position of the high pressure turbine 101 to the steam outlet Y. However, in the case of FIG. 3, the steam is humid steam only from the middle position of the high pressure turbine 101 to the stage merged with the low pressure steam 311.

Accordingly, in the case of FIG. 3, the high pressure turbine exhaust 114 becomes dry steam. After the high pressure turbine exhaust 114 is exhausted from the steam outlet Y and flows into the reheater 109 so that it is heated therein, the heated high pressure turbine exhaust 114 flows into the intermediate pressure turbine 102.

Here, the expansion line of FIG. 3 will be described in detail.

The pre-merging high pressure turbine expansion line 401 changes from the high pressure turbine inlet point 204 to the low pressure steam pre-merging point 403, and the post-merging high pressure turbine expansion line 402 changes from the low pressure steam post-merging point 404 to the high pressure turbine outlet point 205. However, even when the former reaches the humid region, the latter does not reach the humid region. In FIG. 3, the high pressure turbine exhaust 114 is heated at the reheater 109 up to a temperature equal to the temperature of the high pressure turbine inlet steam 112.

In the case of FIG. 3, the number of stages in which the steam other than in the vicinity of the outlet of the low pressure turbine 103 becomes humid steam decreases without changing the properties and the statuses of the steam of the inlets of the high pressure turbine 101 and the reheat turbine 113. Accordingly, since a degradation of the turbine internal efficiency caused by moisture loss is prevented compared to the related art, the turbine cycle performance is improved. Furthermore, the possibility of generating of erosion caused by minute water drops colliding with the surface of the turbine blade decreases other than in the vicinity of the outlet of the low pressure turbine 103. Meanwhile, in the case of FIG. 3, it is considered that erosion is not generated at a flow rate of the steam inside the general high pressure turbine 101.

Furthermore, since the high pressure turbine exhaust 114 is dry steam, specific enthalpy may be specified by measuring the pressure and the temperature thereof. Accordingly, the amount of heat input from the heater 110 to the turbine cycle may be specified, and the thermal efficiency of the turbine cycle may be recognized. Furthermore, since the turbine of which exhaust is humid steam is not plural, but the low pressure turbine 103 only, the internal efficiency of each turbine may be specified.

If a turbine cycle is provided such that the number of the turbine stages from the stage merged with the low pressure steam 311 increases and the reheat turbine 113 is removed, moisture loss until reaching the pressure of the condenser 104 increases so that the turbine cycle performance becomes lower than that of any one of the embodiment and the related art.

(Use of Solar Heat)

In the embodiment, the heater 110 produces the high pressure steam 112 and the low pressure steam 311 by changing the water 111 into steam using solar heat. Furthermore, the reheater 109 heats exhaust from the steam outlet (the exhaust port) Y using solar heat. The solar heat is supplied from a solar energy collector 119 (FIG. 5) in the form of heat of the heating medium 119.

Furthermore, in FIG. 1, the turbine at the upstream of the reheater 109 is only one turbine (the high pressure turbine 101). However, a plurality of turbines may be disposed at the upstream of the reheater 109 to be connected to each other in series, and the plurality of turbines connected to each other in series may be set as the high pressure turbine. In this case, the high pressure steam inlet X is disposed at, for example, the most upstream of the turbine located at the most upstream of the plurality of turbines, and the steam outlet Y is disposed at, for example, the most downstream of the turbine located at the most downstream of the plurality of turbines. Furthermore, the low pressure steam inlet 301 is provided at any turbines among the plurality of turbines.

Furthermore, in FIG. 1, the high pressure steam 112 and the low pressure steam 311 are produced by the same heater (the heater 110), but the steam 112 and 311 may be produced by the different heaters. That is, the high pressure steam 112 and the low pressure steam 311 may be produced by one heater or a plurality of heaters.

In the expansion line of FIG. 2, it is set such that the steam inside the high pressure turbine 101 does not change into humid steam at a time point of the turbine stage of the low pressure steam inlet 301, and changes into humid steam in the expansion line of FIG. 3. Furthermore, in this case, as shown in FIG. 6, a reheat regeneration cycle may be configured in which the extraction steam 120 is extracted from the middle position of one or more turbines among the high pressure turbine 101, the intermediate pressure turbine 102, and the low pressure turbine 103, and the extraction steam 120 is used to heat the water 111.

In the steam turbine cycle using solar heat, the temperature of the high pressure turbine inlet steam 112 is lower than that of the steam turbine cycle using heat of combusted exhaust gas of fuel in many cases. For this reason, there is a large merit that dry steam may be prevented from changing into humid steam and the number of stages in which the steam inside the turbine becomes humid steam may be decreased.

(Trough Condensing Type Solar Energy Plant)

Figure 8:
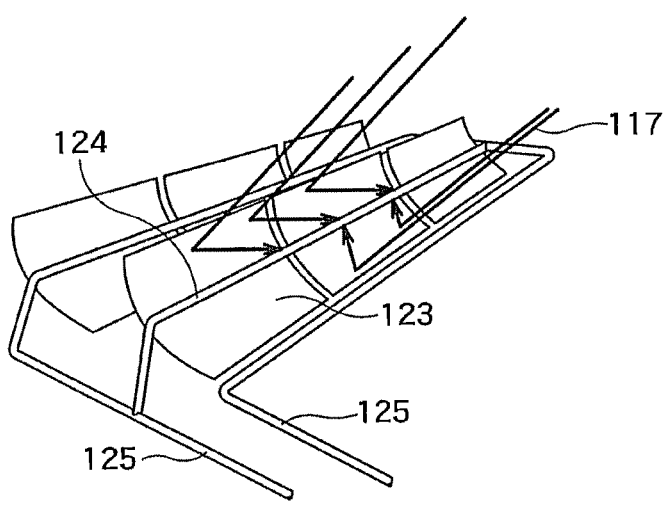
FIG. 8 is a schematic diagram illustrating an example of a trough condensing type solar energy collector.

In the embodiment, a solar energy collector 119 (refer to FIG. 5), for example, a trough condensing type shown in FIG. 8 is used. In this case, the trough condensing type solar energy collector 119 may be used in combination with a reheat regeneration cycle shown in FIG. 6.

Due to the actual temperature raising capacity in the condensing type and the heatproof temperature of oil used as the heating medium 118, the produced high pressure turbine inlet steam 112 has, for example, a pressure of 100 ata and a temperature of 380° C. The high pressure turbine inlet steam 112 is sufficiently close to the humid region in the diagrammatic drawing of specific enthalpy-specific entropy. Therefore, in the trough condensing type, there is a high possibility that the high pressure turbine exhaust 114 becomes humid steam. For this reason, the configuration of the embodiment is useful in the case of using the trough condensing type in that dry steam may be prevented from changing into humid steam and the number of stages in which the steam inside the turbine becomes humid steam may be decreased.

(High Pressure Turbine Inlet Steam Condition 1)

In the embodiment, for example, a difference between the temperature of the steam at the inlet of the high pressure turbine 101 as the turbine at the most upstream side and the saturation temperature of the pressure of the steam at the inlet of the high pressure turbine 101 is set to be 100° C. or less, and in this condition, the steam turbine cycle is configured. In the case where a difference in temperature is 100° C. or less, the high pressure turbine inlet steam 112 is sufficiently close to the humid region in the diagrammatic drawing of specific enthalpy-specific entropy. This condition may be applied in combination with the reheat regeneration cycle shown in FIG. 6.

The above-described condition may be applied to not only the steam turbine cycle using solar heat, but also the cycle in which the high pressure turbine inlet steam 112 is sufficiently close to the humid region in the diagrammatic drawing of specific enthalpy-specific entropy, and the same effect as that of the case of using solar heat may be obtained. Therefore, the turbine may be configured as a thermal power turbine using a combusted exhaust gas as a heat source, and in this case, the heating medium 118 is a combusted exhaust gas.

Figure 5:
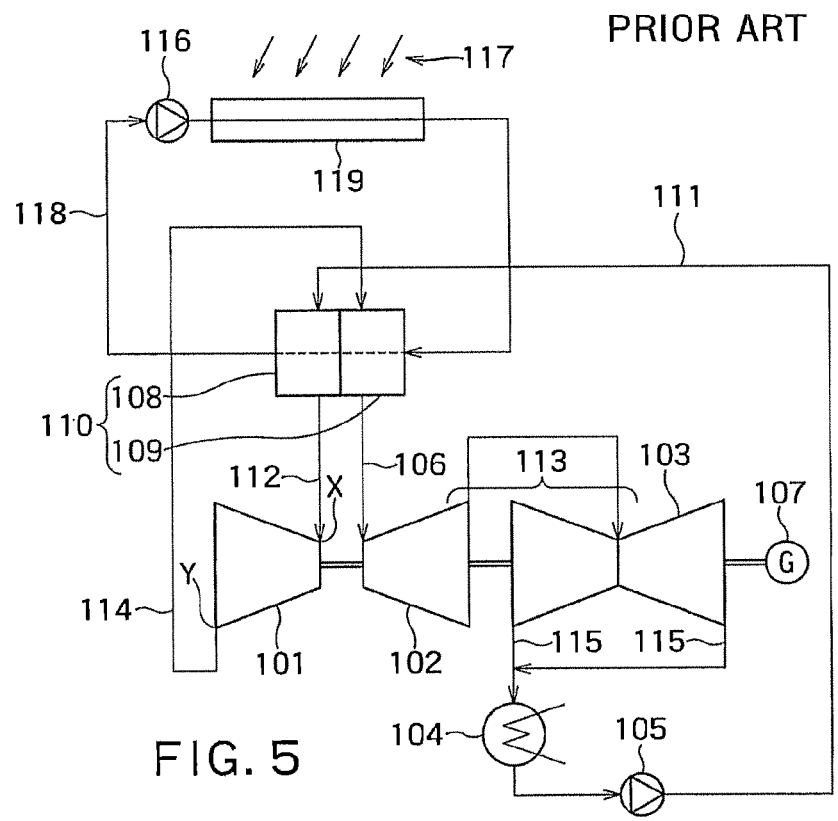
FIG. 5 is a schematic diagram illustrating an example of a conventional steam turbine plant.

Meanwhile, in the nuclear turbine, the flow of the heating medium 118 in the heater 110 is different from the flow shown in FIG. 5 in many points.

Furthermore, in the case where a plurality of turbines are disposed to be connected to each other in series at the upstream of the reheater 109, the turbine at the most upstream side among these turbines becomes the turbine at the most upstream side constituting the steam turbine plant of FIG. 1.

(High Pressure Turbine Inlet Steam Condition 2)

In the embodiment, for example, the steam at the inlet of the high pressure turbine 101 as the turbine at the most upstream side has a pressure of 20 ata or more and a temperature of 420° C. or less, and in this condition, the steam turbine cycle is configured. In the case where the steam at the inlet of the high pressure turbine 101 has a pressure of 20 ata or more and a temperature of 420° C. or less, the high pressure turbine inlet steam 112 is sufficiently close to the humid region in the diagrammatic drawing of specific enthalpy-specific entropy. This condition may be applied in combination with the reheat regeneration cycle shown in FIG. 6.

The above-described condition may be applied to not only the steam turbine cycle using solar heat, but also the cycle in which the high pressure turbine inlet steam 112 is sufficiently close to the humid region in the diagrammatic drawing of specific enthalpy-specific entropy. The turbine may be configured as a thermal power turbine using a combusted exhaust gas as a heat source or a nuclear turbine, and the same effect as that of the case of using solar heat may be obtained.

Meanwhile, in the nuclear turbine, the flow of the heating medium 118 in the heater 110 is different from the flow shown in FIG. 5 in many points.

Furthermore, in the case where a plurality of turbines are disposed to be connected to each other in series at the upstream of the reheater 109, the turbine at the most upstream side among these turbines becomes the turbine at the most upstream side constituting the steam turbine plant of FIG. 1.

(Steam Turbine Cycle)

The steam turbine plant of the embodiment includes three turbines in total, that is, the high pressure turbine 101 as the turbine at the most upstream side, the intermediate pressure turbine 102, and the low pressure turbine 103 as the turbine at the most downstream side.

In the embodiment, it is desirable that the turbine other than the low pressure turbine 103 among these turbines is operated so that the steam circulating inside the turbine is maintained as dry steam without changing into humid steam. In this case, only the low pressure turbine 103 is operated so that the steam circulating inside the turbine changes from dry steam into humid steam. In this case, the humid steam is not present other than in the vicinity of the outlet of the low pressure turbine 103. As a result, a degradation of the turbine internal efficiency caused by moisture loss may be prevented, and the turbine cycle performance may be improved. Further, the possibility of generating of erosion in the high pressure turbine 101 decreases. Furthermore, the internal efficiency of each turbine may be specified.

As described above, in the embodiment, the high pressure steam 112 flows into the high pressure steam inlet X of the high pressure turbine 101, and the low pressure steam 311 flows into the low pressure steam inlet 301 located at the downstream of the high pressure steam inlet X, thereby operating the high pressure turbine 101. Accordingly, the steam inside the high pressure turbine 101 may be prevented from changing from dry steam into humid steam, or the number of stages in which the steam becomes humid steam may be decreased.

In the embodiment, since the steam inside the high pressure turbine 101 (further, all turbines other than the low pressure turbine 103) is prevented from changing from dry steam into humid steam, a degradation of the turbine internal efficiency caused by moisture loss may be reduced so that the turbine cycle efficiency may be improved. Further, there is no possibility of generating of erosion in the high pressure turbine 101. Furthermore, the internal efficiency of each turbine may be specified. The same applies to the case where the number of stages in which the steam inside the high pressure turbine 101 becomes humid steam decreases. In this case, a degradation of the internal efficiency of the turbine may be prevented, and the possibility of generating of erosion decreases.

Hereinafter, a second embodiment of the invention will be described. The second embodiment is a modification of the first embodiment. Therefore, in the second embodiment, the differences from the first embodiment will be mainly described.

Second Embodiment

Figure 4:
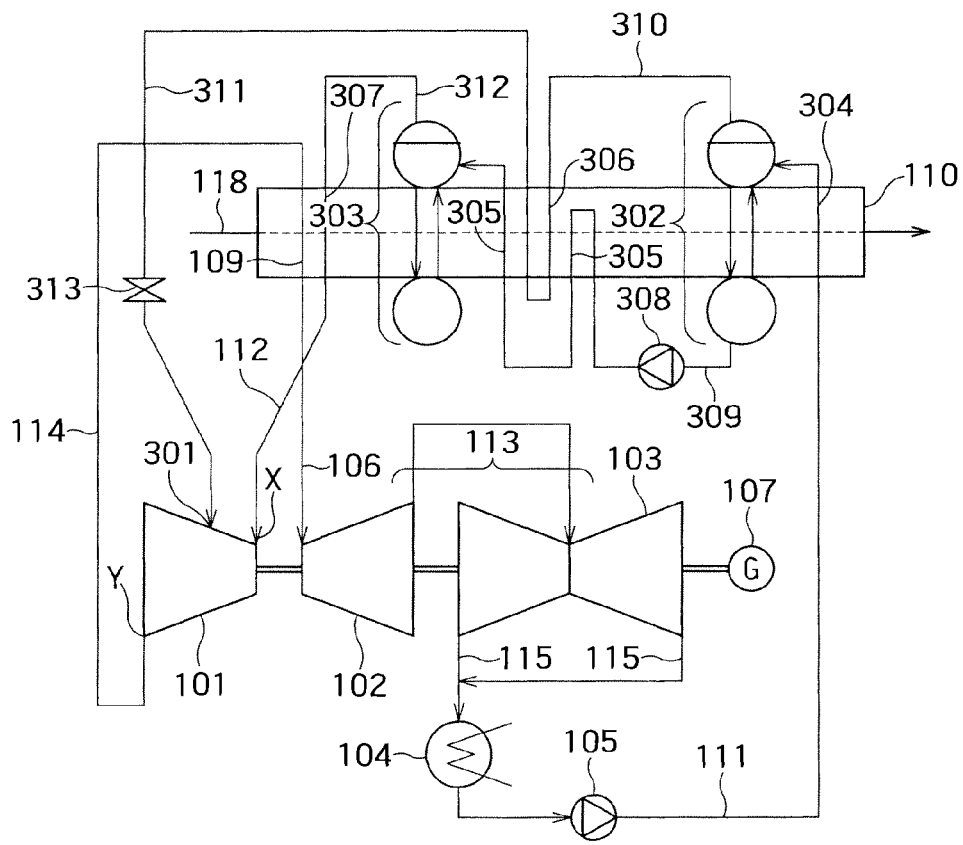
FIG. 4 is a schematic diagram illustrating a configuration of a steam turbine plant of a second embodiment.

FIG. 4 is a schematic diagram illustrating a configuration of a steam turbine plant of the second embodiment. As for the configuration shown in FIG. 4, the differences from the configuration shown in FIG. 1 or 5 will be mainly described.

In the embodiment, the passageway of the low pressure steam 311 is provided with a steam valve 313 that may adjust the flow rate of the low pressure steam 311 or stop the circulation thereof. In FIG. 4, the steam valve 313 is provided between the heater 110 and the low pressure steam inlet 301 of the high pressure turbine 101.

The pressure and the temperature of the high pressure turbine inlet steam 112 or the high pressure turbine exhaust 114 are different in accordance with the flow rate of the high pressure turbine inlet steam 112 or the amount of heat input from the boiler 108, and the degree close to the humid region is different. For example, in the case of using solar heat, the amount of heat input from the boiler 108 changes in accordance with a change of the weather.

If the high pressure turbine exhaust 114 becomes humid steam when the steam valve 313 is fully closed, the steam valve 313 is opened to circulate the low pressure steam 311. Accordingly, the high pressure turbine exhaust 114 may be set as dry steam. If the high pressure turbine exhaust 114 is dry steam even when the steam valve 313 is fully closed, the steam valve is maintained to be fully closed. When the high pressure turbine exhaust 114 is set as dry steam, the enthalpy loss generated by the merging with the low pressure steam 311 may be reduced so that the turbine cycle performance is improved.

Furthermore, when the steam valve 313 is configured as a flow rate control valve, the flow rate of the low pressure steam 311 may be adjusted in accordance with an opening degree of the valve. In this case, if the high pressure turbine exhaust 114 becomes humid steam when the steam valve 313 is fully closed, the low pressure steam 311 may be circulated by an amount necessary for changing the high pressure turbine exhaust 114 into dry steam. When the high pressure turbine exhaust 114 is set as dry steam, the enthalpy loss generated by the merging with the low pressure steam 311 may be reduced so that the turbine cycle performance is improved.

In the embodiment, as shown in FIG. 6, a reheat regeneration cycle may be configured in which extraction steam 120 is extracted from the middle position of one or more turbines among the high pressure turbine 101, the intermediate pressure turbine 102, and the low pressure turbine 103, and the extraction steam 120 is used to heat the water 111.

The technology of the embodiment may be applied to not only the steam turbine cycle using heat, such as solar heat, but also the cycle in which the high pressure turbine inlet steam 112 is sufficiently close to the humid region in the diagrammatic drawing of specific enthalpy-specific entropy. Therefore, the turbine may be configured as a thermal power turbine using a combusted exhaust gas as a heat source, and in this case, the heating medium 118 is a combusted exhaust gas.

Furthermore, in a nuclear turbine, the flow of the heating medium 118 in the heater 110 is different from the flow shown in FIG. 5 in many points.

As described above, in the embodiment, the passageway of the low pressure steam 311 is provided with the steam valve 313 that adjusts the flow rate of the low pressure steam 311 or stops the circulation thereof. Accordingly, the high pressure turbine exhaust 114 may be set as dry steam by adjusting the flow rate of the low pressure steam 311 or stopping the circulation thereof. Therefore, a degradation of the turbine internal efficiency caused by moisture loss may be prevented, and the turbine cycle performance may be improved. Furthermore, the enthalpy loss generated by the merging with the low pressure steam 311 may be removed or reduced by stopping the circulation of the low pressure steam 311 or circulating it by a necessary amount so that the turbine cycle performance may be improved.

As described above, according to the embodiment of the invention, the steam turbine plant is provided which is capable of preventing a degradation of the turbine internal efficiency caused by moisture loss and improving the turbine cycle performance.

While examples of specific aspects of the invention have been explained with reference to the first and second embodiments, the invention is not limited to those embodiments.

The invention claimed is:

1. A steam turbine plant comprising:
a heater configured to change water into steam, the heater producing high pressure steam and low pressure steam having a lower pressure than the high pressure steam by using heat from a single heat source;
a high pressure turbine having a first inlet to supply the high pressure steam, a second inlet to supply the low pressure steam and located downstream of the first inlet, and an exhaust port located downstream of the second inlet, the high pressure turbine being configured such that the high pressure steam supplied from the first inlet drives the high pressure turbine, expands in the high pressure turbine, decreases in pressure, and is then merged with the low pressure steam supplied from the second inlet in the high pressure turbine, and the merged high pressure steam and low pressure steam further drive the high pressure turbine, expand in the high pressure turbine, decrease in pressure, and are then exhausted from the exhaust port;
a reheater located downstream of the high pressure turbine and configured to heat the steam exhausted from the exhaust port; and
a reheat turbine located downstream of the reheater and configured to be driven by the steam from the reheater.

2. The plant of claim 1, further comprising a solar energy collector configured to collect solar heat,
wherein the heater and the reheater are configured to heat the water or the steam to be heated by the solar heat.

3. The plant of claim 2, wherein
the solar energy collector is a trough condensing type solar energy collector.

4. The plant of claim 1, wherein
the high pressure turbine is driven such that a difference between the temperature of the steam at the first inlet and the saturation temperature under the pressure of the steam at the first inlet is 100° C. or less.

5. The plant of claim 1, wherein
the high pressure turbine is driven such that inlet steam at the first inlet has a pressure of 20 ata or more and a temperature of 420° C. or less.

6. The plant of claim 1, further comprising:
a steam valve configured to adjust a flow rate of the low pressure steam or to stop a circulation of the low pressure steam.

7. The plant of claim 1, wherein
a turbine, other than the most downstream turbine among all turbines of the steam turbine plant, is configured to operate such that the steam circulating inside the turbine is maintained as dry steam.

* * * * *